Oct. 30, 1923.
J. C. GOOSMANN
WATER CONTROL VALVE
Filed May 15, 1920
1,472,412
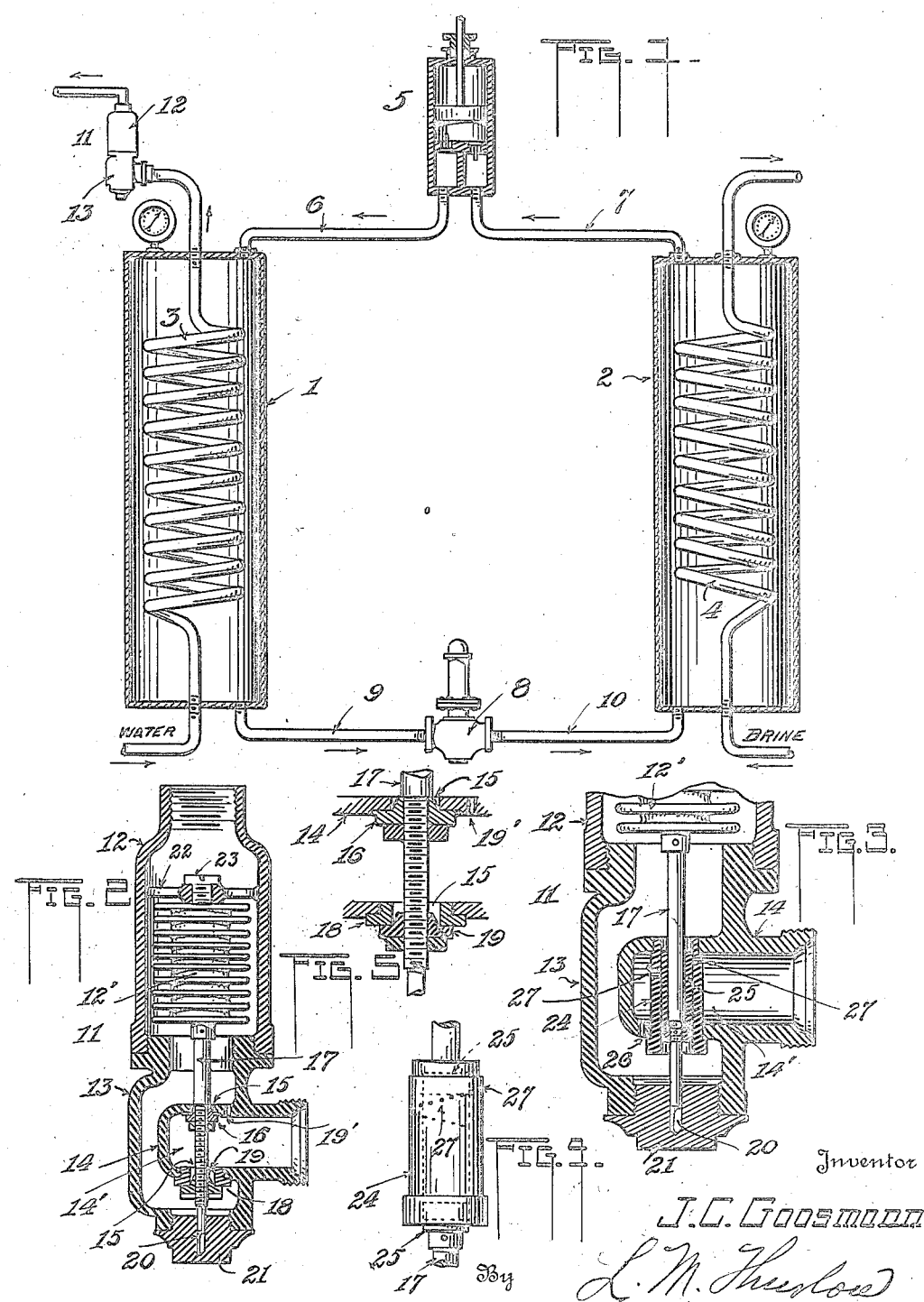

Patented Oct. 30, 1923.

1,472,412

UNITED STATES PATENT OFFICE.

JUSTUS C. GOOSMANN, OF PEORIA, ILLINOIS.

WATER-CONTROL VALVE.

Application filed May 15, 1920. Serial No. 381,741.

*To all whom it may concern:*

Be it known that I, JUSTUS C. GOOSMANN, a citizen of the United States, residing at Peoria, in the county of Peoria and State of Illinois, have invented certain new and useful Improvements in Water-Control Valves; and I do hereby declare that the following is a full, clear, and exact description of the invention, which will enable others skilled in the art to which it appertains to make and use the same.

This invention relates to refrigerating systems. It relates more particularly to the automatic control of water by governing the flow thereof through the condenser of the system in order to maintain the water temperature as nearly constant as possible.

Since pressure and temperature are always interdependent and since, also, condenser pressures are governed by the temperature of water which varies with the season, forcing the condenser pressure to follow it upward or downward, depending on whether summer or winter prevails, it is found desirable to provide means for controlling the water temperature by governing the quantity of water-flow through the condenser in order to establish average condenser-temperatures as nearly constant as posible throughout the year.

One of the objects of the invention is that of simultaneously controlling water temperatures, and of maintaining fixed ratios of pressure in the condenser and evaporator of a refrigerating system.

Another object of the invention, in view of the foregoing, is to include in a refrigerating system, means for controlling water temperatures whereby the condenser pressure can be kept nearly constant.

Another object of the invention is to include in a refrigerating system means for automatically controlling the flow of water by which the temperature thereof within the condenser and, in consequence, the pressure in the latter may be held within fairly narrow limits.

Another object of the invention is to maintain as closely as possible average condenser temperatures by increasing or decreasing the quantity of waterflow through the water coil of the condenser in direct proportion to the increased or decreased heat delivered with the gas into the condenser by the compressor.

Another object of the invention is to eliminate manual control of the water passing through the condenser by automatically starting the flow of water as soon as heat is delivered into the condenser, varying the quantity of water-flow with the variation of heat delivery into condenser and interrupting the water-flow as soon as the heat delivery into the condenser ceases with the stoppage of the compressor.

Still another object of the invention is to maintain constant overflow temperatures of the water and thereby maintain average condenser temperatures as nearly constant as may be possible throughout the year.

Another object is to provide an automatic device in the water line of the condenser coil of a refrigerating system that will be automatically operated to pass more water as the temperature of the water rises, and that will pass less water as the temperature of the water lowers, to the end that the condenser pressure will be maintained substantially constant.

Also, to so organize a thermosensitive device, including a valve operated by it, that although said valve may be entirely closed, shutting off the flow of a controlled medium, the system being idle, a slight flow of such medium will be permitted to flow continuously past the device irrespective of said valve to the end that immediately a change in the temperature of the medium occurs, as in starting the system the device will be affected by temperature change and set in action to operate said valve.

To the end that my invention may be thoroughly understood I have provided the accompanying drawing forming part of this application wherein—

Fig. 1 illustrates a well-known type of refrigerating apparatus showing my invention in connection therewith.

Fig. 2 is a longitudinal section of one form of device for the automatic control of water-flow in a refrigerating system.

Fig. 3 is also a longitudinal section of part of a modified form of the device on a slightly larger scale.

Fig. 4 is an elevation of a valve structure shown in Fig. 2.

Figure 5 is a sectional elevation of parts shown in the same manner as in Figure 2 produced on a larger scale.

In Fig. 1 the reference numbers 1 and 2 designate, respectively, a condenser and an evaporator, said condenser including a pipe coil 3 for water passing in the direction indicated by the darts, the evaporator including a pipe coil 4 for conveying brine. 5 is a compressor for a gas connected by pipes 6 and 7 with the condenser and evaporator respectively, while 8 is a pressure-relation valve, forming the subject of my previous patent applications above referred to, connected to the condenser by a pipe 9 and by a pipe 10 with the evaporator, all thus far described having been shown in said patent application.

The said pressure-relation valve 8 is constructed in such manner that practically a fixed ratio of pressures is automatically maintained in the condenser and evaporator.

In connection with this it is my purpose to automatically control the flow of water through the condenser-coil 3 to the end that its temperature may be maintained substantially constant in order that average condenser temperatures will prevail at all times or under widely varying temperatures of the water entering such coil. This, however, will be better understood by a description of a device for accomplishing this result.

11 designates, as a whole, a valve-body connected with the discharge end of the coil 3, Fig. 1, the water passing through said body and overflowing through the top of the latter.

Said body, for convenience in manufacture, consists of two parts 12 and 13, as shown in Fig. 2, the latter including a portion 14 for connection with the coil 3. Said portion terminates within the part 13 in a pocket 14', through opposite walls of which are openings 15 for the passage of the water from said pocket 14' into said body. One of these openings 15 is closed by a valve 16 on a valve-rod 17 extending into the part 12. The other opening receives a bushing 18 screwed into the wall of the said portion 14, while a valve 19 carried by the said rod 17 closes such opening. 19' is an aperture or pilot in one of the walls of such portion 14 whose purpose will appear presently.

One end of the valve-rod is guided in a socket 20 of a plug 21 which closes one end of the part 13.

Within the part 12 is a hollow metal structure 12' adapted to expand or contract by changes in temperature, known to the trade under the term "sylphon", to one end of which the valve-rod 17 is attached.

The opposite end of the sylphon abuts against a perforate partition or spider 22 within said part 12, there being an adjusting screw 23 in said partition.

It is clear that the valves 16 and 19 are balanced valves so that pressure in the pocket 14' will not influence them, the only action occuring being caused through the expansion or contraction of said sylphon.

In Figs. 3 and 5 a slightly different form of valve arrangement is shown, the valve casing and integral parts being designated by the same reference characters as before.

In this form there is a cylinder 24 extending through the pocket 14' and fitted leak-tight into both walls of the same. Its bore opens at each end into the cavity of the casing portion 13, and a piston 25 on the stem 17 has a sliding fit therein.

At 26 is a pilot-opening in one of the walls of the member 14 corresponding in purpose to aperture 19' of Fig. 2.

The said cylinder 24 has a series of holes 27 through its wall opening into the pocket 14', being spirally disposed substantially as shown in Fig. 4 whereby in the movement of the piston downward the holes will be exposed one ofter another. Naturally the greater the distance traveled by said piston, the greater will be the inflow of water because of the larger number of holes exposed. The spiral arrangement of the holes results in a rapid increase of the number exposed in a limited travel of the piston.

Supposing that the water can enter the device only through the vent 19', Fig. 2, or the vent 26 of Fig. 3, its flow will be so small in volume that its temperature will be quickly raised in passing through the condenser coil 3. In passing toward the overflow it will cause the sylphon to expand and thus operate the valves 16—19, or the piston 25, as the case may be, or equivalent structure, permitting a heavier water-flow, which, being of a lower temperature, in passing the sylphon will cause that member to contract more or less with the natural result that the flow will be decreased to a point where water will be held at an average temperature. The rate of flow will depend entirely upon the temperature of the water as it enters. That is to say, if that temperature is 70° F., for example, which may be that obtaining in summer, the flow will be much more rapid than in winter months when the temperature is very much lower. Naturally, the passage of the colder water will cause the sylphon to contract and reduce the flow to a point where the temperature of the overflow will be substantially the same as before.

It is clear that by thus governing the water-flow and therefore the temperature thereof, the condenser pressure can be governed within certain limits. With the wide changes in feed-water temperatures as between summer and winter, which in some cases may vary as much as 30°, an automatic control of temperature is of considerable advantage both in respect to the control of pressure and economy in the use of water, where, as I have found, the difference between the initial and overflow temperatures can be held within a range of about 10° in summer to as high as 40° in winter.

Furthermore, a refrigerating system employing a temperature control is practically self-governed, needing little or no attention after the sylphon is once set for action.

Combining temperature control with pressure control naturally makes for greater efficiency in a refrigerating system at a lower operating expense than would otherwise be the case.

While I have shown two forms of valve mechanism for controlling the inflow of water through the coil 3, or rather the overflow of the water from the latter, by which the desired temperature results are obtained, other means may perhaps be used, those shown being examples.

In either form, however, the structure is such that the water pressure has no effect upon the valve because in the first form described the valves practically balance one another, and in the other the pressure is in a lateral direction on the piston 25.

The pilot opening in the casing 13 in either type is provided in order that there will always be a flow of water through the sylphon whose temperature will influence that member.

The structure is such, as a novel feature, that the water can reach the sylphon through said pilot opening irrespective of whether the valve is open or shut and therefore upon starting the operation of the system at any time said sylphon is at once influenced by the changing water temperature to open the valve. When the compressor is stopped, the valve will be closed due to contraction of the sylphon as the cooler water meets it.

I claim:—

1. In a control valve, a conduit for a medium whose temperature is to be controlled having a portion extending from one of its walls forming a pocket within said conduit, said pocket having a port in each of two walls, a thermostatic element in the conduit, a valve stem extending from the element, a closure carried by the stem for each of the ports constituting a balanced valve, there being a by-pass in the wall of the pocket within the conduit, for directing the medium upon said element.

2. In a control valve, the combination of a conduit, a spider extending across said conduit, a thermostatic element secured at one end to said spider and disposed in the conduit in the path of the controlled fluid flowing therethrough, a fluid supply chamber projecting into said conduit, means controlled by said thermostatic element for regulating the flow of fluid from said chamber into said conduit, and a port independent of said regulating means through which fluid is continually delivered from said chamber into said conduit to influence said thermostatic element.

In testimony whereof I affix my signature in presence of two witnesses.

JUSTUS C. GOOSMANN.

Witnesses:
SEYMOUR A. WOOLNER,
L. M. THURLOW.